No. 702,612. Patented June 17, 1902.
A. C. ATKIN.
COMBINED AXLE NUT AND OIL CAP FOR WHEELS.
(Application filed July 29, 1901.)
(No Model.)
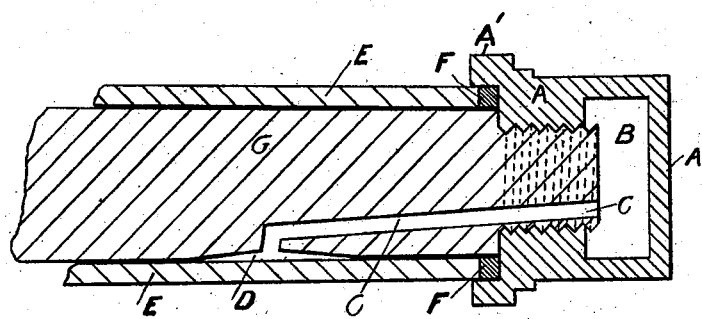
Witnesses:
Inventor
Arthur C. Atkin
By James L. Norris
Atty

UNITED STATES PATENT OFFICE.

ARTHUR CHARLES ATKIN, OF AUCKLAND, NEW ZEALAND.

COMBINED AXLE-NUT AND OIL-CAP FOR WHEELS.

SPECIFICATION forming part of Letters Patent No. 702,612, dated June 17, 1902.

Application filed July 29, 1901. Serial No. 70,152. (No model.)

*To all whom it may concern:*

Be it known that I, ARTHUR CHARLES ATKIN, coach-builder, a subject of His Majesty the King of the United Kingdom of Great Britain and Ireland, residing at the city of Auckland, in the Provincial District of Auckland and Colony of New Zealand, have invented a certain new and useful Combined Axle-Nut and Oil-Cap for Wheels of Vehicles and such Like, of which the following is a specification.

This invention is intended to supply the place of either an axle-nut or oil-cap and nut and to provide the means of keeping the arm of axle constantly oiled.

It consists of the combination in one of the axle-nut and oil-cap at present used on the outer ends of lubricating-axles of vehicles and of an oil-conductor in the axle to carry the oil from the reservoir to the axle-arm.

The accompanying drawing shows one figure, which is a section of part of an axle and of the combined axle-nut and oil-cap thereon.

The combined axle-nut and oil-cap A, with the oil-reservoir B within it, is screwed onto the end of the axle-arm G, so that the latter will project into the reservoir. The arm G is bored to form a lubricant conductor or feeder C, leading from the reservoir B to the groove D on the under side of the axle-arm, which distributes the oil along the arm. The inner end of the cap A is provided with an annular flange A', which is adapted to surround the washer F, the latter being interposed between the box E and cap A. The box E keeps the oil on the arm, while the washer F engages with the flange A' and keeps the combined nut and cap from rattling. A hole countersunk in axle-arm at D can take the place of the groove, if preferred.

In the ordinary axles the wheel requires to be taken off and grease placed on the axle-arm. Then the wheel and nut are replaced, while in the majority of lubricating-axles nuts are employed on the front of the axle-arm to keep the wheel on and the cap for the oil screwed on at the front of the box-covering nut.

The combined axle-nut and oil-cap in itself keeps the wheel on and contains the oil necessary for the lubrication of the axle, which oil flows through the feed-passage or bore C. The nut and cap may be of any preferred shape and constructed of any suitable material. It is suitable for axles of any form of vehicles—perambulators, cycles, and agricultural implements—and can be used on light vehicles on which lubricating-axles have never previously been used, no oil-axle in the past having been found suitable.

Having fully described my invention, what I desire to claim and secure by Letters Patent is—

In a lubricating-axle, an axle-arm having a bore forming a feed-passage for the lubricant, said passage extending from the outer end of said arm downwardly at an inclination and terminating at its inner end in a groove on the under side of the said arm, said passage having its outer end arranged eccentrically with respect to the center of the axle-arm, an integral axle-nut and an oil-cap, said oil-cap forming a reservoir for the lubricant, said axle-nut adapted to be mounted upon the axle-arm so that the latter with the outer end of the feed-passage will extend through the nut and into the reservoir without engaging the walls of the latter, a washer interposed between the nut and arm, there being a flange integral with the nut and cap surrounding and engaging the washer to prevent the former from rattling, substantially as herein shown and described.

ARTHUR CHARLES ATKIN.

Witnesses:
GEORGE WILLIAM BASLEY,
PERCY HERBERT BASLEY.